US012572316B2

(12) United States Patent
Dunn et al.

(10) Patent No.: US 12,572,316 B2
(45) Date of Patent: *Mar. 10, 2026

(54) DISPLAY UNIT WITH VANDALISM DETERRENCE FEATURES

(71) Applicant: Manufacturing Resources International, Inc., Alpharetta, GA (US)

(72) Inventors: William Dunn, Alpharetta, GA (US); John Schuch, Buford, GA (US); Peter Kaszycki, Alpharetta, GA (US); Douglas Bennett, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/258,029

(22) Filed: Jul. 2, 2025

(65) Prior Publication Data

US 2025/0335142 A1 Oct. 30, 2025

Related U.S. Application Data

(63) Continuation of application No. 18/897,250, filed on Sep. 26, 2024, now Pat. No. 12,373,153.

(60) Provisional application No. 63/542,477, filed on Oct. 4, 2023.

(51) Int. Cl.
| | |
|---|---|
| *G06F 3/14* | (2006.01) |
| *G08B 21/18* | (2006.01) |
| *H04N 7/18* | (2006.01) |

(52) U.S. Cl.
CPC ......... *G06F 3/1423* (2013.01); *G08B 21/182* (2013.01); *H04N 7/181* (2013.01)

(58) Field of Classification Search
CPC ...... G06F 3/1423; G08B 21/182; H04N 7/181
USPC .......................................................... 348/159
See application file for complete search history.

(56) References Cited

U.S. PATENT DOCUMENTS

| | | | | | |
|---|---|---|---|---|---|
| 2006/0121947 A1* | 6/2006 | Lee | ..................... | H04M 1/7243 |
| | | | | | 455/566 |
| 2007/0132773 A1* | 6/2007 | Plante | .................. | G07C 5/0891 |
| | | | | | 345/564 |
| 2008/0150902 A1* | 6/2008 | Edpalm | ................. | G06F 1/1626 |
| | | | | | 345/173 |
| 2009/0231130 A1* | 9/2009 | Martini | ............... | G07F 19/2055 |
| | | | | | 340/540 |
| 2012/0122418 A1* | 5/2012 | Hicks, III | ............... | H04W 4/12 |
| | | | | | 455/404.1 |

(Continued)

FOREIGN PATENT DOCUMENTS

JP 2017187876 A * 10/2017

*Primary Examiner* — Matthew David Kim

(74) *Attorney, Agent, or Firm* — Standley Law Group LLP; Jeffrey S. Standley; Adam J. Smith

(57) ABSTRACT

Display units with vandalism deterrence are disclosed, along with related systems and methods. A display unit includes electronic display(s), shock sensor(s), and a controller which receives data from the shock sensor(s). Where the controller determines that the data received from the shock sensor(s) is outside of one or more predetermined parameters, the controller initiates a vandalism detected signal, which may electronically and automatically cause changes to ongoing operations of some or all of the one or more electronic displays.

18 Claims, 4 Drawing Sheets

(56)　　　　　　References Cited

U.S. PATENT DOCUMENTS

| | | | |
|---|---|---|---|
| 2015/0009168 A1* | 1/2015 | Levesque | G06F 3/016 |
| | | | 345/174 |
| 2016/0323643 A1* | 11/2016 | Panchaksharaiah | |
| | | | H04N 21/4753 |
| 2017/0175411 A1* | 6/2017 | Bowers | G07F 19/201 |
| 2019/0359172 A1* | 11/2019 | Galicia Rodríguez | |
| | | | G08B 13/00 |
| 2019/0373998 A1* | 12/2019 | Knittel | A45C 5/14 |
| 2023/0005360 A1* | 1/2023 | Zhou | G06N 20/20 |
| 2023/0013582 A1* | 1/2023 | Wang | H04N 7/01 |

* cited by examiner

100

10

12

14

32

Content here!

30

34

16

20

22

28

18

26A

26B

24

Detect shock event

Determine which electronic display is associated with shock event

Implement vandalism deterrence protocol at associated electronic display

DISPLAY UNIT WITH VANDALISM DETERRENCE FEATURES

CROSS-REFERENCE TO RELATED APPLICATIONS

This application is a continuation of U.S. application Ser. No. 18/897,250 filed Sep. 26, 2024, which claims the benefit of U.S. provisional patent application Ser. No. 63/542,477 filed Oct. 4, 2023, the disclosures of each of which are hereby incorporated by reference as if fully restated herein.

TECHNICAL FIELD

Exemplary embodiments relate generally to display units with vandalism deterrence features, as well as systems and methods related to the same.

BACKGROUND AND SUMMARY OF THE INVENTION

Digital out of Home ("DOOH") advertising is an increasingly popular way to reach members of the public. DOOH advertising is accomplished using electronic displays, typically placed within ruggedized enclosures. Typically, these display units are placed in heavily trafficked public spaces to maximize exposure to viewers/would-be-consumers. Such public placement, however, also exposes the display units to potential vandals and other wrong doers. Display units are known to be subject to vandalism, such as by blunt force impact (e.g., baseball bat striking unit). These units are expensive to install and maintain. Thus, vandalism can result in significant expenses to display owners. Therefore, what is needed is a display unit with vandalism deterrence features.

Display units with vandalism deterrence features are provided. The display units may include one or more shock sensors. The shock sensor(s) may include, by way of non-limiting example, microelectromechanical systems ("MEMS") type sensors, accelerometers, gyroscopes, combinations thereof, or the like. A controller may monitor data from the sensor(s). Where the data indicates a shock event above a predetermined threshold or other established parameters, one or more protocols may be automatically initiated by the controller. The protocols may include any one or more of: displaying a particular image or images resembling a broken or damaged unit (e.g., simulated broken/cracked glass, blank display, scrambled image, error message, combinations thereof, or the like), display a particular image or images indicating awareness of the actions and/or consequences thereof (e.g., vandalism detected, law enforcement alerted, combinations thereof, or the like), display a particular image or images indicating awareness of persons and/or events involved (e.g., recorded and/or live image from display unit camera of perpetrators of shock events), combinations thereof, or the like.

Alternatively, or additionally, the units may be configured to record images from one or more cameras of the display unit of the relevant time period (e.g., on loop of predetermined length which is normally overwritten but stored where the shock event is detected, images following event, combinations thereof, or the like). These images may be displayed live at the unit, stored locally, and/or transmitted to a remote device (e.g., associated with law enforcement, display unit owner, display unit operator, display unit manufacturer, other remote site, combinations thereof, or the like), for example.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
FIG. 1 is a simplified plan view of an exemplary display unit with vandalism deterrence features and related system.
Figure 2:
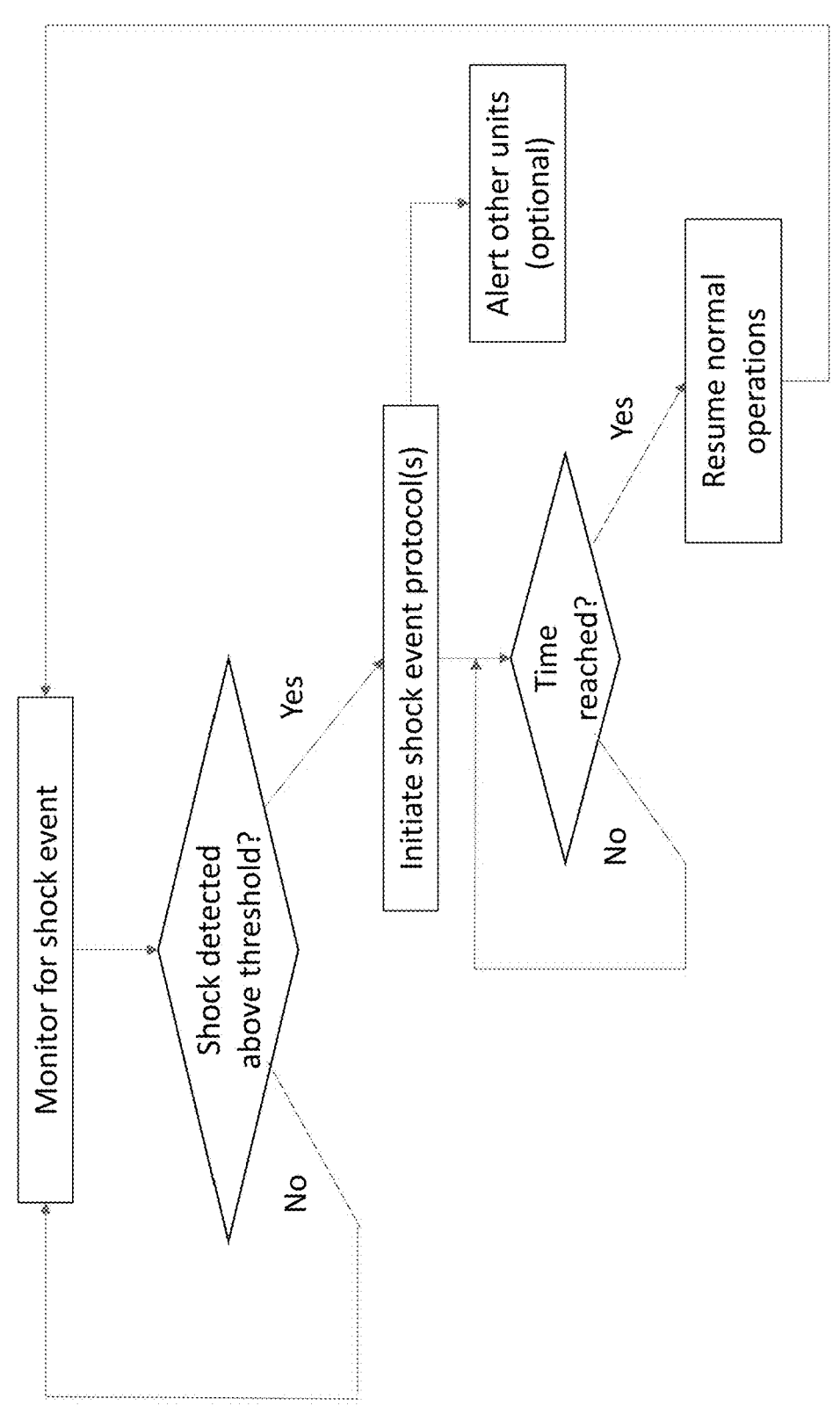
FIG. 2 is a flow chart with exemplary logic for operating the display unit and/or system of FIG. 1.

FIG. 1 illustrates a display assembly 10 (hereinafter also the "unit") with vandalism deterrence features and related system 100. FIG. 2 provides an exemplary method for operating the unit 10 and/or system 100.

The assembly 10 may comprise, by way of non-limiting example, some or all of the BOLDVU® displays and/or components thereof and/or related thereto available from Manufacturing Resources International, Inc. of Alpharetta, Georgia, and/or some or all of the disclosures of US Pub. No. 2022/0132681 published Apr. 28, 2022, and/or US Pub. No. 2023/0136695 published May 4, 2023, the disclosures of each of which are hereby incorporated by reference as if fully restated herein.

The assembly 10 may comprise a structural framework 12, which may comprise one or more members, housings, panels, combinations thereof, or the like. The assembly 10 may comprise one or more electronic displays 14. The electronic displays 14 may comprise liquid crystal type displays, though any type or kind of display may be utilized. Any number and/or arrangement of the electronic displays 14 may be utilized.

The assembly 10 may comprise a field programmable gate array ("FPGA") or other programmable logic device 16 in electronic communication with the electronic display 14. A media player 18 may be in electronic communication with the programmable logic device 16. A database 20 may be in electronic communication with the media player 18. The database 20 may be local to the assembly 10 and/or remote therefrom. For example, the assembly 10 may comprise one or more network communication devices 22 to facilitate such remote connection.

Video files for playing may be received at the database 20 by way of local physical connection (e.g., USB drive, etc.) or remote upload, such as from one or more remote devices 26A by way of one or more networks 24 and the network connection device 22. The networks 24 may comprise one or more internets (e.g., world-wide web), intranets, cellular networks, near field communication networks, ad hoc networks, local area networks, combinations thereof, or the like. The remote devices 26 may comprise computers, servers, tablets, smartphones, combinations thereof, or the like. Video files may optionally be stored at the database 20 locally for calling up. Alternatively, or additionally, video files may be streamed by way of the network connection device 22 and the network(s) 24.

The controller 30 may control the display of images at the display 14, such as by way of one or more of the programmable logic device 16, media player 18, and/or database 20.

The assembly 10 may comprise one or more sensors 28. The sensors 28 may comprise shock sensors, force sensors, vibration sensors, accelerometers, gyroscopes, combinations thereof, or the like. In exemplary embodiments, the sensors 28 comprise MEMS sensors. At least some of the sensors 28, in exemplary embodiments, without limitation, are mechanically connected, directly or indirectly, to the structural framework 12, housing, electronic display 14, combinations thereof, or the like. In this way, at least certain mechanical forces experienced at the assembly 10 may be translated to the sensor(s) 28 for detection.

The controller 30 may receive data from the sensor(s) 28, such as on a continuous or periodic basis. For example, without limitation, the controller 30 may periodically query the sensor(s) 28 for data, and/or the sensor(s) 28 may be programmed to periodically provide data to the controller 30. The controller 30 may monitor the received data for existence of a shock event. A shock event may be determined where readings from the shock sensor(s) (e.g., MEMS sensor(s), for example, without limitation) indicate impact to the assembly 10, such as but not limited to by reading(s) which exceed one or more predetermined thresholds, are outside of certain predetermined ranges, and/or are otherwise outside certain expected readings or behavior.

Where a shock event is determined at the controller 30 based, at least in part, on readings from at least some of the sensor(s) 28, the controller 30 may automatically implement one or more shock protocols. The shock protocols may be implemented through one or more software routines, programs, or the like, which may be stored locally and/or remotely.

The shock protocols may include displaying a particular image or images at the electronic display(s) 14. The image (s) may resemble a broken or damaged unit 10 and/or component(s) thereof, such as but not limited to image(s) resemble broken and/or cracked glass, blank display, scrambled image, error message, combinations thereof, or the like for the electronic display(s) 14. In this way, the perpetrators may assume that they have successfully broken the unit 10 and/or the electronic display(s) 14 thereof, as intended, causing them to move on, such as to other targets or activities.

Alternatively, or additionally, the image(s) may indicate awareness of the shock event, underlying cause(s), and/or consequences thereof. For example, without limitation, the image(s) may indicate that vandalism is detected, law enforcement is being or has been alerted, recording in progress, combinations thereof, or the like. Alternatively, or additionally, the image(s) may indicate detection of person (s) and/or events involved. For example, without limitation, the image(s) may comprise recorded and/or live images from one or more cameras 32 of the display unit 10, which may be in electronic communication with the controller 30. These image(s) may capture perpetrators or other objects or events presumably causing the detected shock event(s). In exemplary embodiments, without limitation, the controller 30 may be configured to record images from the camera(s) 32 on a constantly overwritten loop of predetermined length (e.g., 10 minutes, by way of non-limiting example). Where a shock event is determined, the controller 30 may be configured to store the looped footage from a predetermined amount of time before the detected event (e.g., 2 minutes prior, by way of non-limiting example) and/or after (e.g., 8 minutes after, by way of non-limiting example). This may minimize electronic storage burdens. The footage may be stored locally, such as at the controller 30 and/or the database 20, and/or be transmitted to one or more remote devices 26, such as associated with display unit 10 owners, operators, and/or manufactures 26A (e.g., network operations center), law enforcement 26B, private security, government offices, offsite backup storage, combinations thereof, or the like. Alternatively, or additionally, the controller 30 may be configured to begin recording at the shock event and continue for a period of time thereafter (e.g., 7 minutes, without limitation).

Alternatively, or additionally, the controller 30 may be configured to play one or more recorded messages (e.g., please step away from the unit 10, law enforcement has been notified, siren, combinations thereof, or the like), such as by way of one or more speakers 34 at the units 10 in electronic communication with the controller 30 and/or visually at the electronic display(s) 14. In these ways, the perpetrators may abandon their efforts out of fear they have or will be caught and/or evidence may be preserved for possible action (e.g., civil lawsuit and/or criminal charges). This may lead to relief for actions and/or deterrence from future vandalism.

After a predetermined period of time (e.g., 20 minutes, without limitation), the controller 30 may be configured to resume normal operations, to the extent possible. The time periods, such as but not limited to one or more of the recording lengths and/or period of time for resuming normal operations, may be user-specified and may be updated from time-to-time. The remote devices 26 which receive the recordings may be user specified.

Figure 3:
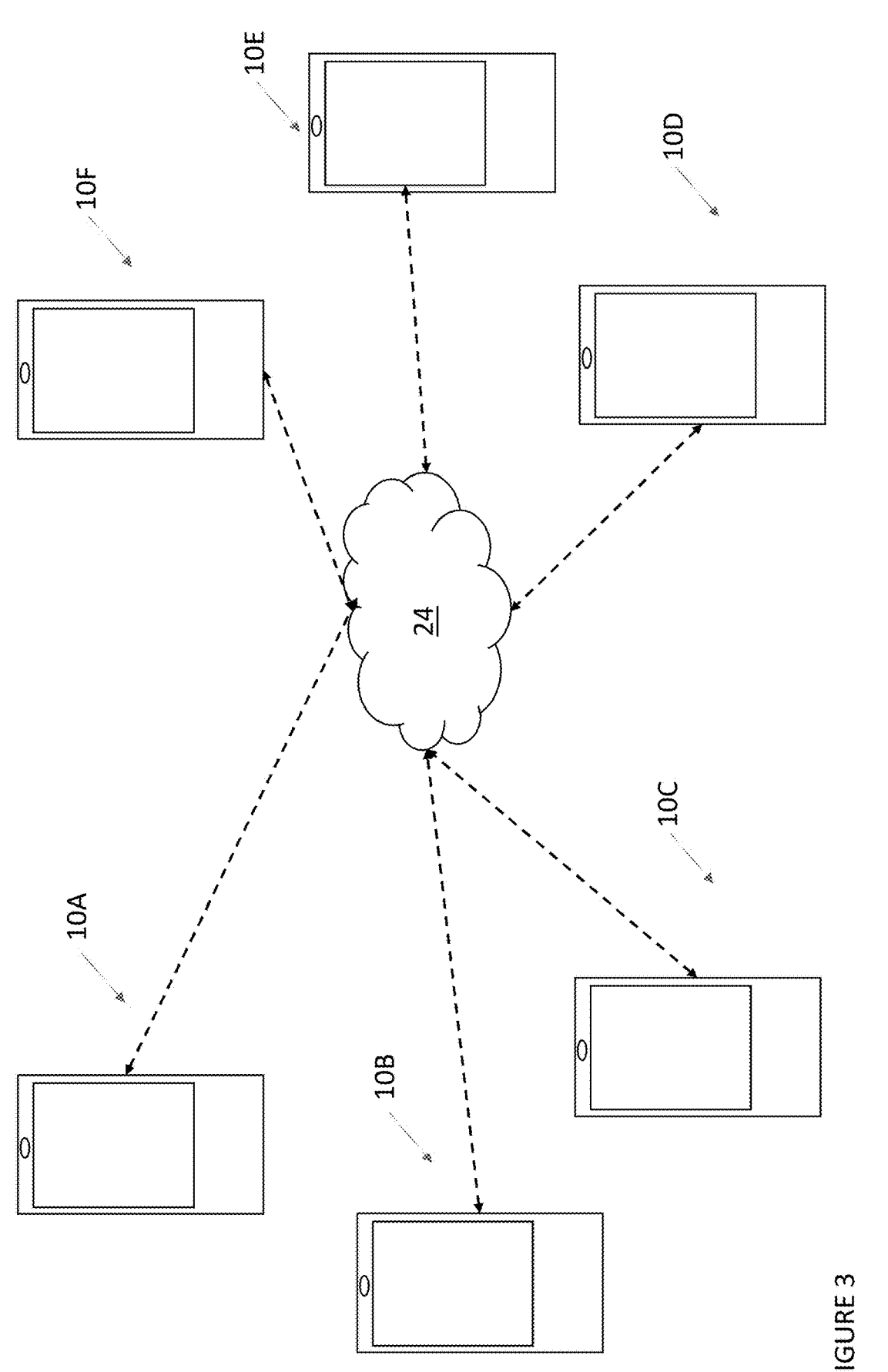
FIG. 3 is a simplified plan view of an exemplary network of units.

As illustrated with particular regard to FIG. 3, in exemplary embodiments, without limitation, multiple units 10A-10F may be in electronic communication with one another, such as by way of one or more networks 24 and/or the network connection devices 22 and/or controllers 30 of the units 10. In such embodiments, by way of non-limiting example, and on an optional basis, as indicated at FIG. 2, where a shock event is detected at a given one of the units 10 of a network of multiple units 10, the controller 30 of the impacted unit 10 may be configured to signal additional units 10 in the network, such as by way of the communication devices 22. The controller(s) 30 of such additional unit(s) 10 may be configured to, upon receipt of such notifications/signals, preemptively implement the vandalism protocol. The notified units 10 may be those within a predetermined distance from the impacted one of the units 10 (e.g., 10 city blocks, 1 mile, 100 feet, etc.). The distance for notification may be user-programmed and updated from time to time. The location of the units 10 in the network(s) may be known/stored, such as locally at each unit 10 and/or at a remotely accessible database. This feature may assist with protecting units 10 network wide on a preemptive basis. For example, without limitation, where a relatively large-scale unrest event is occurring (e.g., riot spanning multiple city blocks), it may be beneficial to preemptively simulate existing damage at other, nearby units 10 because they may present a less attractive target to would-be vandals.

Figure 4:
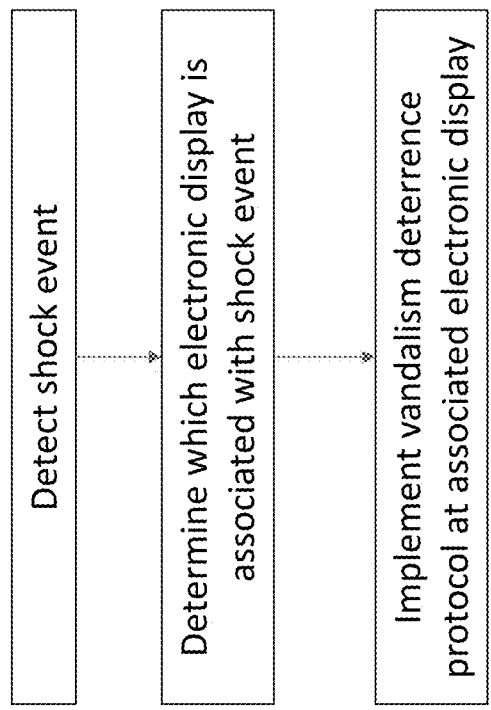
FIG. 4 is a flow chart with exemplary logic for operating the display unit and/or system of FIGS. 1-3.

As illustrated with particular regard to FIG. 4, by way of non-limiting example, multiple electronic displays 14 may be provided at a given display unit 10. Multiple shock sensors 28 may be provided at such units 10, each associated with a respective one of the electronic displays 14. The controller 30 may be configured to implement the vandalism deterrence protocol on a display 14 specific basis, in accordance with which of the sensor 28 the data is received from indicating the shock event.

In exemplary embodiments, without limitation, the controller 30 may determine from which of the sensors 28 the data is received indicating the shock event. For example, without limitation, if a rear one of the displays 14 is impacted, the vandalism deterrence protocol (e.g., blank screen image) may be provided at only the rear one of the displays 14 while the front one of the displays 14 of the unit 10 continues to operate normally. In other embodiments, without limitation, the controller 30 may be configured to implement the vandalism deterrence protocol at all displays 14 of an impacted unit 10, regardless of which of the sensors 28 the data is received from and/or where a single sensor 28 is utilized. In yet other exemplary embodiments, without limitation, the data from the sensor 28 may indicate a direction of impact, and the vandalism deterrence protocol may be initiated at a respective one of multiple displays 14 accordingly (i.e., the display 14 which the data indicates the shock event originated from).

While vandalism is sometimes discussed, the units 10 and/or various components thereof may detect other types of shock events, intentional and/or unintentional, such as, but not limited to, vehicular collisions with units 10, natural disasters, animal strikes, combinations thereof, or the like.

Multiple units 10 may be in electronic communication with the remote devices 26, though such is not required.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A display unit with vandalism deterrence, said display unit comprising:
   one or more electronic displays;
   one or more shock sensors; and
   a controller in electronic communication with the one or more electronic displays and the one or more shock sensors, said controller comprising one or more of non-transitory electronic storage devices comprising software instructions, which when executed, configure one or more processors of the controller to:
   receive data from the one or more shock sensors; and
   where the data from the one or more shock sensors is outside of one or more predetermined parameters, automatically initiate an electronic vandalism detected signal electronically and automatically causing changes to ongoing operations of at least one of the one or more electronic displays, including causing simulated damage to be displayed at the at least one of the one or more electronic displays.

2. The display unit of claim 1 wherein:
   the one or more predetermined parameters comprise a shock event threshold.

3. The display unit of claim 1 wherein:
   the one or more shock sensors comprise a microelectromechanical system.

4. The display unit of claim 1 wherein:
   the simulated damage comprises at least one of: an image simulating a broken or cracked display surface, an image simulating a blank screen or display, a blank screen or display, an image simulating an error message, and an error message.

5. The display unit of claim 1 wherein:
   the changes to ongoing operations include displaying an indication that law enforcement has been and/or is being alerted.

6. The display unit of claim 1 further comprising:
   one or more cameras, each facing outward, wherein each of the one or more cameras are in electronic communication with the controller, and wherein the changes to ongoing operations include displaying images from the one or more cameras.

7. The display unit of claim 1 further comprising:
   one or more cameras, each facing outward, wherein each of the one or more cameras are in electronic communication with the controller, and wherein the changes to ongoing operations include transmitting images from the one or more cameras from a predetermined time period associated with initiation of the vandalism deterrence protocol to at least one remote device.

8. The display unit of claim 1 further comprising:
   one or more speakers in electronic communication with the controller, wherein the changes to ongoing operations include providing, by way of the one or more speakers, a pre-recorded audio message.

9. The display unit of claim 1 wherein:

said one or more of non-transitory electronic storage devices of said controller comprise additional software instructions, which when executed, configure said one or more processors to:

operate the display unit normally prior to initiating the electronic vandalism detected signal, including commanding display of advertising images at the one or more electronic displays;

monitor an elapsed period of time from initiating the electronic vandalism detected signal where the data received from the one or more sensors remains within the one or more predetermined parameters; and where the elapsed period of time reaches a predetermined threshold, command normal operations of the display unit to be resumed.

10. The display unit of claim 1 further comprising:

a housing for the one or more electronic displays;

a cover forming, in part, a forward portion of the housing, wherein the one or more electronic displays each comprise a directly backlit liquid crystal type display positioned interior to the housing and rearward of the cover; and one or more media players in electronic communication with the controller.

11. The display unit of claim 1 wherein:

the one or more electronic displays comprise multiple electronic displays;

the one or more shock sensors comprise multiple shock sensors, each associated with a respective one of the electronic displays; and the controller is configured to initiate the electronic vandalism detected signal on a display specific basis fashion.

12. The display unit of claim 1 further comprising:

a network communication device in electronic communication with the controller and facilitating electronic communication with other display units, wherein the controller is configured to alert at least one of the other display units to the initiation of electronic vandalism detected signal at the display unit in response to such initiation at the display unit.

13. A method for providing vandalism deterrence at the display unit of claim 1, said method comprising:

operating the display unit normally, including displaying advertising images at the one or more electronic displays;

receiving data from the one or more shock sensors at the controller;

determining, at the controller, that the data from the one or more shock sensors is outside of one or more predetermined parameters, and automatically initiating the electronic vandalism detected signal, thereby electronically causing changes to the ongoing operations of the at least one of the one or more electronic displays;

monitoring, at the controller, further data from the one or more shock sensors at the controller and an elapsed period of time from initiating the vandalism detected signal where the further data is within the one or more predetermined parameters; and upon determining, at the controller, that the elapsed period of time reaches a predetermined threshold, causing the normal ongoing operations to be resumed.

14. A system providing vandalism deterrence for display units, said system comprising:

display units, each comprising:

one or more electronic displays;

one or more shock sensors;

a network communication device facilitating communication between the display units; and a controller in electronic communication with the one or more electronic displays, the one or more shock sensors, and the network communication device, said controller comprising one or more of non-transitory electronic storage devices comprising software instructions, which when executed, configure one or more processors of the controller to:

operate the one or more electronic displays, including causing advertising images to be displayed thereon;

receive data from the one or more shock sensors;

receive electronic notifications from other of the display units; and where a received one of the electronic notifications from the other display units indicates a shock event, cause changes to the ongoing operations of at least one of the one or more electronic displays of the display unit, including causing simulated damage to be displayed at the at least one of the one or more electronic displays.

15. The system of claim 14 wherein:

the one or more of non-transitory electronic storage devices comprise additional software instructions, which when executed, configure one or more processors of the controller to:

where the data received from the one or more shock sensors of the display unit is outside of one or more predetermined parameters, initiate the electronic vandalism detected signal at the display unit and cause the changes to the ongoing operations of the at least one of the one or more electronic displays of the display unit.

16. The system of claim 15 wherein:

the simulated damage includes at least one of: an image simulating a broken or cracked display surface, an image simulating a blank screen or display, a blank screen or display, an image simulating an error message, and an error message.

17. The system of claim 15 wherein:

said one or more of non-transitory electronic storage devices comprise additional software instructions, which when executed, configure said one or more processors to:

transmit the electronic vandalism detected signal to at least one other one of the display units.

18. The system of claim 17 wherein:

the one or more of non-transitory electronic storage devices comprise additional software instructions, which when executed, configure one or more processors of the controller to:

transmit the electronic vandalism detected signal to each of the other display units within a predetermined geographic distance of the display unit.

* * * * *